United States Patent
Wei et al.

(10) Patent No.: US 6,414,315 B1
(45) Date of Patent: Jul. 2, 2002

(54) RADIATION IMAGING WITH CONTINUOUS POLYMER LAYER FOR SCINTILLATOR

(75) Inventors: Ching-Yeu Wei, Niskayuna, NY (US); Robert Forrest Kwasnick, Palo Alto, CA (US); David Francis Fobare, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/411,299

(22) Filed: Oct. 4, 1999

(51) Int. Cl.[7] .............................................. G01T 1/202
(52) U.S. Cl. ................................ 250/370.11; 250/488.1
(58) Field of Search ....................... 250/370.11, 370.09, 250/367, 368, 488.1

(56) References Cited

U.S. PATENT DOCUMENTS

| 5,132,539 A | * | 7/1992 | Kwasnick et al. | ...... 250/361 R |
| 5,153,438 A | * | 10/1992 | Kingsley et al. | ....... 250/370.09 |
| 5,187,369 A | | 2/1993 | Kingsley et al. | |
| 5,401,668 A | * | 3/1995 | Kwasnick et al. | ............. 437/3 |
| 5,463,225 A | * | 10/1995 | Kwasnick et al. | ...... 250/370.11 |
| 5,506,409 A | * | 4/1996 | Yoshida et al. | ............. 250/368 |
| 5,585,280 A | * | 12/1996 | Kwasnick et al. | ............. 437/4 |

FOREIGN PATENT DOCUMENTS

DE  40 32 034  4/1991

OTHER PUBLICATIONS

"Enhanced Columnar Structure in CsI Layer by Substrate Patterning," Tao Jing; G. Cho; J.Drewery; I. Fujieda; SN Kaplan; A. Mireshghi; V. Perez–Mendez; D. Wildermuth, IEEE, Nov. 2, 1991, pp. 213–216.

* cited by examiner

Primary Examiner—Georgia Epps
Assistant Examiner—Richard Hanig
(74) Attorney, Agent, or Firm—Lester R. Hale; Donald S. Ingraham

(57) ABSTRACT

A radiation imager includes a light sensitive imaging array, a barrier layer formed over the light sensitive imaging array, a continuous polymer layer formed over the barrier layer, and a scintillator formed directly on the continuous polymer layer. The continuous polymer layer improves the adherence of the scintillator by reducing delamination especially under adverse environmental conditions.

28 Claims, 1 Drawing Sheet

RADIATION IMAGING WITH CONTINUOUS POLYMER LAYER FOR SCINTILLATOR

BACKGROUND OF THE INVENTION

The present invention generally relates to digital imaging. More particularly, the present invention relates to digital imaging via the conversion of radiation into visible light impinging on light sensitive imaging elements.

Transportation, storage and operation of radiation imaging equipment often exposes the equipment to adverse environmental conditions, such as temperature variations and cycles during operation and shipping. Such environmental conditions have the potential to damage the radiation imaging equipment. For example, such imagers include a scintillator, which converts radiation into visible light, that may experience delamination under such conditions, resulting in image degradation, potentially rendering the radiation imager unusable. The term "delamination" refers to a separation of the scintillator from the material that is underneath it at one or more points on the imager. Once delamination begins, it may further spread beyond the initial point or area of damage.

SUMMARY OF THE INVENTION

The present invention provides, in a first exemplary embodiment, apparatus for radiation imaging. The apparatus includes a light sensitive imaging array, a continuous polymer layer adjacent the imaging array, and a scintillator situated on the continuous polymer layer. The continuous polymer layer enhances the adhesion of the scintillator to the imaging array.

The present invention provides, in another exemplary embodiment, a method of fabricating a radiation imager, the imager including a light sensitive imaging array. The method includes forming a continuous polymer layer over the light sensitive imaging array, and forming a scintillator directly on the continuous polymer layer.

BRIEF DESCRIPTION OF THE DRAWING

The FIGURE is a simplified cross-sectional view of portion of an exemplary radiation imager in accordance with the present invention.

DETAILED DESCRIPTION OF THE INVENTION

Figure 1:
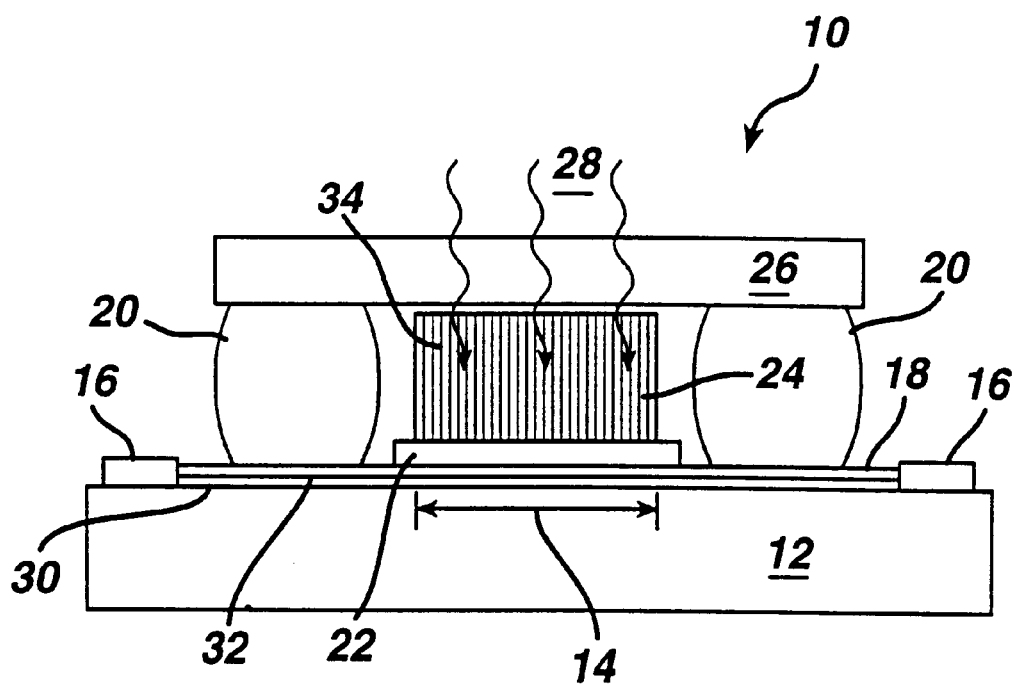

Radiation imager 10 includes a substrate 12, light sensitive imaging array 14 for receiving optical photons and producing electrical signals for processing external readout circuitry (not shown), electrical contact pads 16 for electrical connection of the imaging array to external components, imaging array barrier layer 18 which protects the imaging array, sealant 20, continuous polymer layer 22 that provides improved adhesion for the scintillator, scintillator 24 for receiving radiation and emitting optical photons in response, and c over plate 26.

In operation, radiation 28 penetrates the substantially x-ray transmissive cover plate 26 and enters scintillator 24. The scintillator emits optical photons in response to the absorption of incident radiation of the type to be imaged. The type of scintillating material is matched to the type of radiation being used. For medical imaging with x-ray energy of about 20 to about 140 KeV, thallium-doped cesium iodide with a thickness of about 100 to about 1000 microns is a typical scintillating material. The emitted visible light then penetrates the polymer and barrier layers, impinging on light sensitive imaging array 14. The impingement of the light results in generation of corresponding electrical signal by the photosensors in the array that are periodically read and processed by readout electronics.

A radiation imager such as imager 10 commonly is used in the medical field, in manufacturing for nondestructive testing of parts, computer tomography, explosive detection, and other applications.

Transportation, storage and operation of radiation imaging devices can expose such devices to adverse environmental conditions, such as, for example, vibrations and temperature cycles (e.g., from extremes of about −40° C. to about 85° C.), potentially resulting in damage to the imager in the form of delamination of the scintillator.

In accordance with this invention, polymer layer 22 provides a delamination resistant foundation for scintillator 24. As used herein, "delamination resistant foundation" and the like refer to a material layer underlying and in direct contact with the scintillator that provides a surface to which the scintillator adheres; further, under the adverse environmental conditions outlined above, the scintillator exhibits superior adhesion to the foundation layer as compared with adhesion under similar conditions to the barrier layer. This improvement can be quantified by the increase in temperature range the imager can withstand without delamination under a specified temperature cycling protocol. For example, improvements in the temperature range (to which the imager can be exposed without delamination) on the order off at least about 15 degrees centigrade have been observed on imagers fabricated in accordance with this invention.

While the exact causes of delamination are not known for certain, several explanations have been advanced. It is known that the barrier layer actually has a non-planar topography, in conformance with the topography of imaging array 14, which non-planar topography may contribute to the delamination. Polymer layer 22 provides a generally planar on which the scintillator is disposed, likely contributing to improved adhesion. "Generally planar," as used herein, refers to height variations along any given section of the surface (e.g., sections about 1 mm in diameter) being reduced to about 1 micron or less, and there are no dihedral angles between the surface and other features along the surface (e.g., at a via).

Another explanation for delamination is that the material of the scintillator simply does not adhere well enough to the material of the barrier layer. Still another explanation for the delamination is that impurities and defects in the barrier layer are covered by the polymer, decoupling them from the scintillator the adhesion of which might be degraded.

The material for the polymer layer preferably has the ability to withstand the expected temperature cycles without being damaged, and preferably is thick enough to cover the barrier layer without degrading the resolution of the imager. In general, the preferred thickness for the polymer layer is greater than about 0.5 microns, and commonly between about 0.5 microns and about 10 microns, depending on the application and the particular polymer used. Temperature extremes cause a large mechanical stress, which likely promotes adhesion failure in whole or in part between the scintillator and what lies beneath, due to the difference in their thermal coefficient of expansion. The coefficient of thermal expansion of the polymer is preferably between that of the scintillator and the barrier layer. Also, the polymer is preferably substantially optically transparent (i.e., having a light transmittance of about 85% or greater at the light wavelengths of interest) to the scintillator light to maximize the amount of light impinging on the array, and also resists optical or physical degradation from the particular radiation it will be exposed to. Further, the polymer is preferably able to withstand the conditions present for formation of the scintillator.

Still further, the polymer material is preferably susceptible to etching, either physically or chemically, to remove it from the regions outside the array 14 and particularly from the area on which sealant 20 will be disposed so as to not compromise the adhesion of sealant 20 to substrate 12. This arrangement is desirable due to the fact that polymers are typically a poor moisture barrier, and the adhesion of the sealant to the polymer is likely not as good as to the barrier layer. By way of example and not limitation, radiation imager 10 is described to include a barrier layer, and one is commonly used; the presence of such a layer is not required by the present invention.

In one exemplary embodiment, radiation imager 10 is an x-ray imager comprising amorphous silicon-based photodetectors. Cover plate 26 comprises, for example, graphite, aluminum, or some other reasonably x-ray transparent and reasonably moisture-impermeable material. Sealant 20 comprises an adhesive, such as, for example, a thermoset epoxy. Scintillator 24 comprises, for example, cesium iodide doped with thallium and having a thickness on the order of about 0.1 to about 1.0 mm. The scintillator will be described in more detail below. Continuous polymer layer 22 comprises, for example, a preimidized polyimide (e.g., Arch Chemicals, Inc. PROBROMIDE 200 Series) of about 1 to about 2 microns (or more) in thickness. Layer 22 is continuous with respect to the scintillator, i.e., layer 22 comprises a sheet under the scintillator that has high structural integrity, without structural defects that would leave uncovered portions of the imager array (i.e., the barrier layer disposed over the array) underlying the scintillator 24. Further, polymer layer 22 has boundaries that are at least coextensive with the boundaries of scintillator 24 (that is, polymer layer 22 underlies scintillator 24 at all points on the imager array, but may extend beyond the scintillator boundaries).

Contact pads 16 in the imager comprise, for example, a sandwich of metal or other conductive material on the bottom, a dielectric or other insulator in the middle, and indium tin oxide on top. The contact pads electrically connect to address lines of the light sensitive imaging array. Barrier layer 18 comprises, for example, a bottom layer of silicon oxide and a top layer of silicon nitride. The barrier layer will be discussed in greater detail below. Substrate 12 comprises, for example, glass (e.g., Corning 1737), and light sensitive imaging array 14 could be, for example, an array of photodiodes.

In an alternative exemplary embodiment, the continuous polymer layer of the x-ray imager described in the previous paragraph comprises, for example, parylene C of at least about 1 micron, and commonly in a range of about 1 micron to about 10 microns in thickness, and preferably about 7 microns in thickness. However, as between polyimide and parylene C, polyimide is more commonly used as parylene C is more difficult to use in manufacturing because it is deposited by a conformal vapor deposition process, so the locus of material is difficult to control. For example, parylene C will deposit on the sides and back of the substrate. This excess material must then be removed. Thus, parylene C is difficult to pattern, since standard photolithography techniques, which best work on the top surface, cannot be used. Other alternative materials for the continuous polymer layer include other polyimides, photosensitive polyimides, and acrylics.

One way to pattern parylene C is with the use of a mechanical mask to protect the sides and back of the substrate from being coated. However, the use of a mechanical mask increases the risk of damage to the imager, and must be done with precision.

The barrier layer 18 comprises, for example, two layers; a first (bottom) layer of silicon oxide, and a second (top) layer of silicon nitride. The first and second layers are deposited by, for example, plasma-enhanced chemical vapor deposition. The thickness of the first layer is preferably about 0.02 to about 0.1 microns, and the thickness of the second layer is preferably about 0.1 to about 2 microns. The first layer is preferred to be silicon oxide, as silicon nitride may negatively interact with the array during deposition. In the fabrication process, the first and second layers of the barrier layer may be deposited during the same subprocess.

An exemplary embodiment for fabrication of radiation imager 10 will now be described in detail. This discussion assumes the substrate, light sensitive imaging array, and contact pads are provided. The barrier layer is patterned to allow electrical contact to the underlying layers from external circuitry. The continuous polymer layer 22 is then coated and patterned over the barrier layer. As used herein, disposing a layer "over" another component or the like refers to relative positions of imager components in the device and does not imply operational or structural conditions with respect to the orientation of the device. One example of a coating method for the polymer layer is known as spinning, wherein the polymer is in liquid form and applied over the barrier layer while the workpiece is rotated at about 1000 rpm, thereby evenly spreading the polymer on the barrier layer. Spinning, however, results in the vast majority of the liquid polymer being spun off and thus wasted. Another example of an application method for the polymer layer is known as meniscus coating, wherein a bar coated with liquid polymer sweeps very near and across the surface of the barrier layer, leaving a film of the polymer behind. Such application methods are commonly used in the art. The polymer layer typically is patterned with photoresist, etched in a plasma containing oxygen, and the photoresist stripped with wet resist stripper (e.g., Arch Chemicals, Inc. QZ3298).

After formation of the polymer layer, the scintillator is formed directly on the polymer layer. One way to form the scintillator is by physical vapor deposition in the form of needles (e.g., needle 34 in the FIGURE), which tend to collimate the light. Each needle is typically several microns in diameter and several hundred microns long. This aspect ratio in which the needle is relatively long compared to a relatively short diameter provides a scintillator in which most optical photons emerge from the bottom of the scintillator (toward the light sensitive imaging array) substantially near the photosensor pixel underlying the location where the incident radiation was absorbed in the scintillator. The scintillator also desirably efficiently optically couples the optical photons into the light sensitive imaging array; that is, the majority of photons strike the barrier layer at angles of incidence so that substantially all photons pass into the array without being reflected at any of the following interfaces: between the scintillator material and the silicon nitride in the barrier layer; between the silicon nitride and the silicon oxide in the barrier layer; and between the silicon oxide of the barrier layer and the upper portion of the light sensitive imaging array.

Physical vapor deposition generally involves the scintillator material being heated to a high temperature to liquefy it. The vapor comes off the liquid, and settles on the relatively cold workpiece surface. Alternatively, it is possible in some applications to form the scintillator by cutting the scintillator from a crystal and attaching it mechanically. The thickness of the scintillator will of course depend on the material used and the purpose for the imager. For example, for medical applications, a scintillator of cesium iodide doped with thallium is preferably on the order of about 0.1 to about 1.0 mm in thickness, and the doping level is on the order of about 0.05% to about 10% by weight.

Optionally, a layer of adhesive reflective material (not shown) may be interposed between the scintillator top surface and the cover plate that is disposed over the top of the scintillator across the imager. The main purpose of such a reflective layer is to reflect light from the scintillator top surface back down to be detected by the light sensitive imaging array. Another purpose in some applications is to prevent light from being reflected by the cover plate, since the cover plate is typically not in contact with the scintillator over its entire inner surface, while the reflective layer is substantially in contact, and light reflected by the cover plate is likely to spread farther, thus degrading image resolution.

Sealing may be accomplished with application of a bead of a thermoset epoxy (e.g., Armstrong A661) or other adhesive and moisture-resistant material around the perimeter of the cover plate, between it and the barrier layer.

Optionally, a small amount of the barrier layer between the polymer layer and the contact pads may be removed prior to sealing by, for example, reactive ion etching. Reactive ion etching typically involves placing the imager in a vacuum, introducing a gas or gases, with or without plasma, that will react chemically with the workpiece surface to remove the contact pads. For example, if the barrier layer included silicon nitride, then the reactive ion etching could be done with a gas mixture of $CHF_3$, Ar and $O_2$. This creates a fresh surface for sealing.

The invention has been described with respect to exemplary embodiments; it will be understood by those skilled in the art that various changes may be made and equivalents substituted for elements thereof without departing from the scope of the invention. Therefore, it is intended that the invention not be limited to the particular embodiments disclosed for carrying out the invention, but that the invention will include all embodiments falling within the scope of the appended claims.

What is claimed is:

1. An apparatus for radiation imaging, comprising:
    a detector substrate;
    a light sensitive imaging array disposed on the detector substrate;
    a continuous polymer layer disposed over the light sensitive imaging array;
    a scintillator disposed on the continuous polymer layer and optically coupled therethrough to the imaging array;
    a cover plate disposed over the scintillator and the detector substrate;
    a sealant disposed between a portion of the detector substrate and the cover plate, so as to seal a perimeter of the cover plate to the portion of the detector substrate, wherein the continuous polymer layer is situated so that it does not underlay the sealant.

2. The apparatus of claim 1, wherein the continuous polymer layer comprises a material selected from the group consisting of polyimides, acrylics, and parylene C.

3. The apparatus of claim 2, wherein the polyimide comprises preimidized polyimide.

4. The apparatus of claim 1, wherein the continuous polymer layer has a substantially planar surface on which the scintillator is disposed.

5. The apparatus of claim 1, wherein the scintillator comprises cesium iodide doped with thallium.

6. The apparatus of claim 1, further including a barrier layer situated between the light sensitive imaging array and the continuous polymer layer.

7. The apparatus of claim 6, wherein a coefficient of thermal expansion for the continuous polymer layer has a value that is within a range between a coefficient of thermal expansion for the barrier layer and a coefficient of thermal expansion for the scintillator.

8. The apparatus of claim 1, wherein the continuous polymer layer is substantially optically transparent.

9. The apparatus of claim 1, wherein the continuous polymer layer provides a delamination-resistant foundation for the scintillator, the boundaries of the continuous polymer layer being at least coextensive with the boundaries of the scintillator.

10. An x-ray radiation imager that is resistant to delamination of component layers, comprising:
    a substrate;
    a light sensitive imaging array disposed on the substrate;
    a barrier layer disposed over the light sensitive imaging array;
    a continuous polymer layer disposed over the barrier layer;
    a scintillator disposed directly on the continuous polymer layer, the continuous polymer layer providing a delamination-resistant foundation to coupled the scintillator to the imaging array;
    a cover plate disposed over the scintillator and the detector substrate; and
    a sealant disposed between a portion of the detector substrate and the cover plate, so as to seal a perimeter of the cover plate to a portion of the detector substrate, wherein the continuous polymer layer is situated so as not to underlay the sealant.

11. The radiation imager of claim 10, wherein the continuous polymer layer is selected from the group consisting of polyimide, acrylic, and parylene C.

12. The radiation imager of claim 11, wherein the continuous polymer layer is disposed over the imaging array to have boundaries that are at least coextensive with the boundaries of the scintillator, such that the polymer layer underlies the scintillator at all areas of the imaging array.

13. The radiation imager of claim 10, wherein the barrier layer is situated such that it does not underlay the-sealant.

14. The radiation imager of claim 13, wherein the sealant comprises a thermosetepoxy.

15. The radiation imager of claim 10, wherein the continuous polymer layer has a thickness of between about 0.5 microns and about 10 microns.

16. The radiation imager of claim 10, wherein the continuous polymer layer has a substantially planar surface on which the scintillator is disposed.

17. The radiation imager of claim 10, wherein the continuous polymer layer has a light transmittance of about 85% or greater.

18. The radiation imager of claim 10, wherein the scintillator comprises cesium iodide doped with thallium.

19. A method of fabricating a radiation imager, the method comprising:
    disposing a light array on a detector substrate;
    forming a continuous polymer layer over the light sensitive imaging array;

forming a scintillator directly on the continuous polymer layer:

disposing a cover plate over the scintillator and the detector substrate;

removing a portion of the continuous polymer layer from a portion of the detector substrate; and disposing a sealant between the cover plate and the portion of the detector substrate, so as to seal the detector substrate to a periphery of the cover plate.

20. The method of claim 19, wherein forming the continuous polymer layer comprises coating the continuous polymer layer by spinning.

21. The method of claim 19, wherein forming the continuous polymer layer comprises coating the continuous polymer layer by meniscus coating.

22. The method of claim 19, wherein forming the continuous polymer layer comprises forming a continuous parylene C layer over the light sensitive imaging array.

23. The method of claim 22, wherein forming the continuous parylene C layer comprises forming a continuous parylene C layer of about 1 to about 10 microns thick over the light sensitive imaging array.

24. The method of claim 19, wherein forming the continuous polymer layer comprises disposing the polymer over the array to have boundaries that are at least coextensive with the boundaries of the scintillator.

25. The method of claim 24, therein forming the continuous polyimide layer comprises forming a continuous polyimide layer of between about 0.5 microns and about 10 microns thick over the light sensitive imaging array.

26. The method of claim 19, wherein forming the scintillator comprises depositing cesium iodide directly on the continuous polymer layer.

27. The method of claim 19, wherein the step of forming the continuous polymer layer comprises applying an acylic.

28. The method of claim 19, wherein forming the continuous polymer layer comprises forming the polymer layer such that it provides a substantially planar surface on which the scintillator is disposed.

* * * * *